J. C. HALL.
Harvester Rake.
No. 66,584.
Patented July 9, 1867.
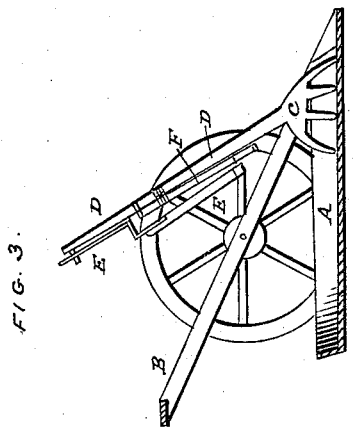
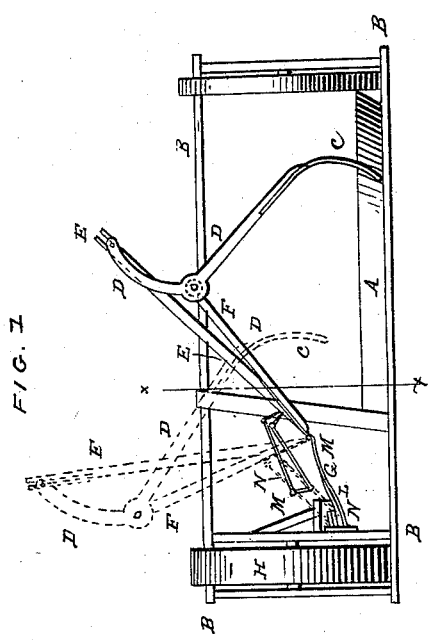
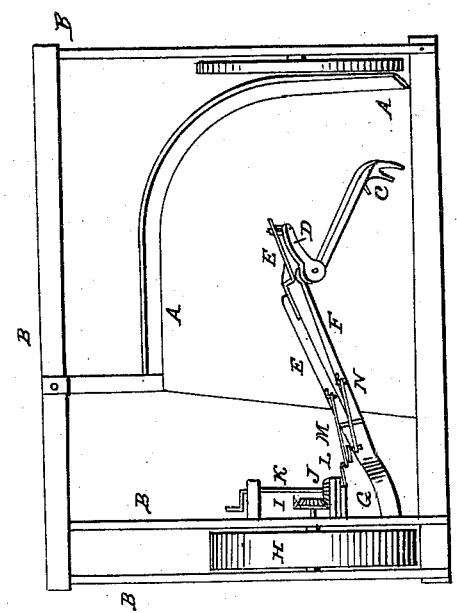
WITNESSES:
INVENTOR.

United States Patent Office.

JOHN C. HALL, OF MONROE, WISCONSIN.

Letters Patent No. 66,584, dated July 9, 1867.

---

IMPROVEMENT IN HARVESTER RAKES.

---

The Schedule referred to in these Letters Patent and making part of the same.

---

TO ALL WHOM IT MAY CONCERN:

Be it known that I, JOHN C. HALL, of Monroe, in the county of Green, and State of Wisconsin, have invented a new and useful Improvement in Raking Attachment for Reapers; and I do hereby declare that the following is a full, clear, and exact description thereof, which will enable others skilled in the art to make and use the same, reference being had to the accompanying drawings, forming part of this specification, in which—

Figure 1 is a front view of my improved self-raking attachment.

Figure 2 is a top view of the same.

Figure 3 is a vertical cross-section of the same, taken through the line $x\ x$, fig. 1.

Similar letters of reference indicate like parts.

My invention has for its object to furnish an improved self-raking attachment for reapers, which shall be so constructed and arranged as to imitate the natural movements in raking the grain from the reaper by hand; and it consists in the combination of the rake and staff, two levers, a compound crank, and two connecting-bars or rods with each other, said parts being constructed and connected to and operated by the driving-wheel, in the manner hereinafter more fully described.

A is the platform upon which the grain falls when cut. B is the frame to which the platform A is attached, and by which the raking attachment is supported. C is the rake-head, which is securely attached to the lower end of the rake-staff D. The rake-staff is made substantially in the form shown in the drawings; that is to say, its lower end, to which the rake-head C is attached, is curved downwards or towards the platform A, and its upper end is curved upward or in the opposite direction, with a somewhat sharper curve. The levers E and F stand inclined backward from the reel, and in such a position that their lower ends are supported about eighteen or twenty inches above the outer edge of the platform A, so that the grain, when raked from the said platform, may pass under them freely. G is an arm, one end of which is securely attached to the frame B, and to its other end are attached the lower ends of the levers E and F by a hinge-joint, as shown in figs. 1 and 2. The long or governing lever E is placed immediately behind the short or operating lever F, and they are of such a length as to support the rake at the proper distance from and in proper relation with the platform A. The rake-staff D is pivoted to the upper end of the short or operating lever F, by a bolt, which passes through the said staff at the point where the upper curve commences, and through the upper end of the said lever. To the lever F and staff D are attached two metallic disks, one to each, at the points through which the bolt passes, to strengthen them, diminish friction, and promote steadiness of motion. To the side of the upper end of the rake-staff D is pivoted a friction-roller or pulley, as shown in the drawings, which works in a slot in the upper part of the long or governing lever E. H is the drive-wheel, to the inner end of the axle of which is attached a gear-wheel, I, the teeth of which mesh into the teeth of the gear-wheel J attached to the crank-shaft K. To enable the movements of the rake to be regulated so that the same-sized bundles may be made in light as in heavy grain, the gear-wheel I may consist of several concentric rings, or cogs, or teeth, into one or the other of which the teeth of the gear J may be made to mesh, according as the rake is desired to operate more rapidly or more slowly. The gear-wheel J may be shifted, as desired, from the one to the other of these rings of teeth by a lever, or by any other of the well-known devices for such purposes. Or the same result may be accomplished by having different-sized gear-wheels, which may be exchanged as required. The crank-shaft K revolves in bearings attached to the frame B of the machine, and upon its forward end is formed, or to it is attached the compound crank L. This crank has two handles or bearings for the reception of the lower ends of the two connecting-rods M and N, and it is so formed that the two bearings may be in different radii of and at different distances from the axis of the crank-shaft K. Or it may be considered as a simple crank, whose handle or bearing is the axis of an additional crank, which, while turning upon its own centre, also revolves around the primary shaft. The upper ends of the connecting-rods or bars M and N are pivoted to the levers E and F, and communicate motion to them from the crank L. In using the machine, to give all the complex and necessary movements to the rake, it is necessary that the two levers E and F shall move at times in the same direction at different rates of velocity; that at times they shall move in opposite directions; and at times that one shall be at rest while the other is in motion. All this is accomplished by the action of the compound crank L, although the relative velocity and the range or throw of the rake are determined, to considerable extent, by the position of the points at which the upper ends of the connecting rods M N are pivoted to the levers E F. When the machine stands in such a position that the rake-head C rests upon the platform A behind the grain to be raked off, the levers E F stand leaning over the platform towards the standing grain. As the machine advances the short lever F is drawn rapidly towards the outer side of the platform, while the long lever, being operated by another part of the compound crank L, at first moves slightly in the opposite direction, then it remains a moment at rest, and then moves slowly after the short lever F. These movements compel the rake-head C to move in a right line across the platform, sweeping the grain from it, and depositing it in a bundle ready for the binder, and out of the way of the machine, in the next "bout." In making these movements the friction-pulley or roller at the upper end of the rake-staff D acts as a fulcrum, and is held firmly in its place in the slot in the upper end of the long lever E, and when the short lever F is forced along it compels the relatively rapid movement of the rake-head. The upper end of the rake-staff is bent backward to place the line of resistance at a sufficiently large angle to the line of motion to permit an easy movement of the rake. During the first part of the raking movement the friction-roller moves up the slot in the lever E to compensate for the curved downward movement that the rake-head would otherwise necessarily make. This movable fulcrum is also necessary to permit the constantly changing relative positions of the two levers E and F. When the crank L has made a half revolution the levers E F stand leaning outward, and the rake-head C is at the outer edge of the platform. As the machine continues to advance, a rapid reverse movement of the short lever F takes place, and the upper end of the rake-staff D being carried a little in the opposite direction, then resting and returning slowly, the rake-head is raised, drawn back from the reel, (owing to the inclined position of the levers E F before mentioned,) carried across the platform above the falling grain, then downward and forward to its former position, ready to again sweep the grain from the said platform.

What I claim as new, and desire to secure by Letters Patent, is—

Operating the rake C by means of the curved staff D, hinged levers E and F of different lengths, compound crank L, and connecting-rods M N, substantially as and for the purpose set forth.

JOHN C. HALL.

Witnesses:
  LEWIS ROTE,
  H. MEDBERY.